Aug. 30, 1932.   C. W. HANSELL   1,874,977
HIGH FREQUENCY METER CONNECTION
Filed May 2, 1927
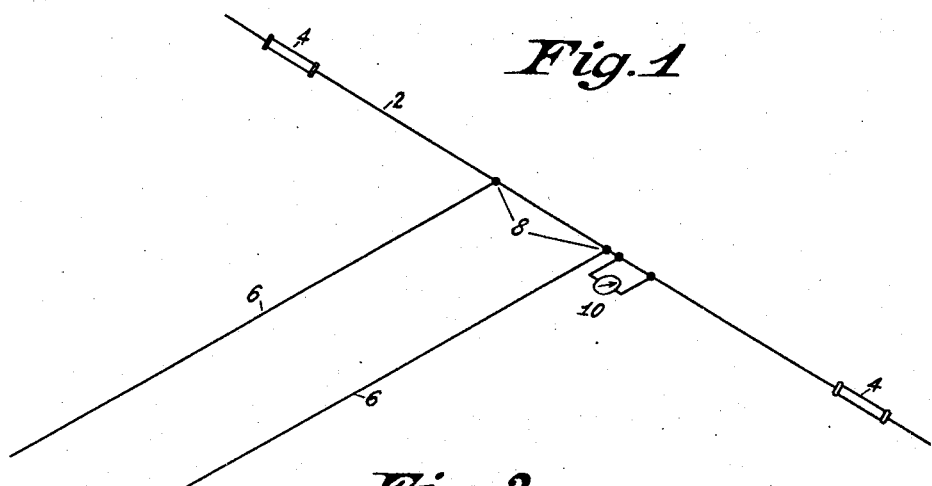
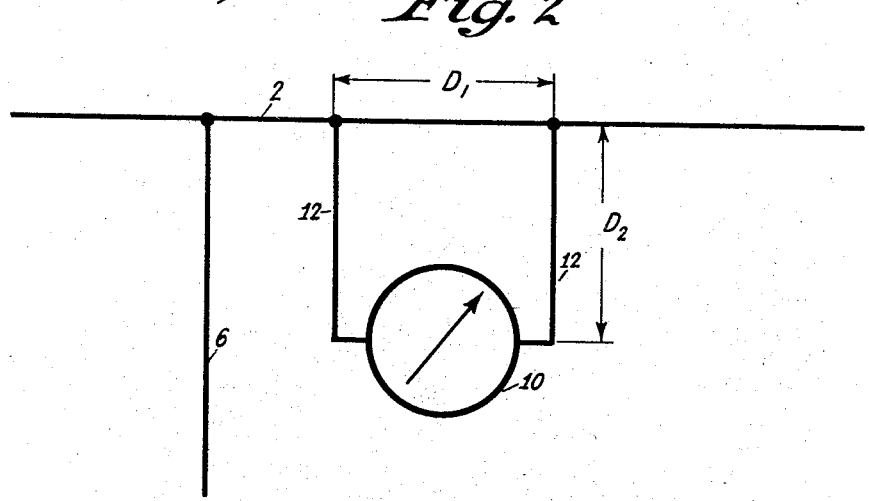
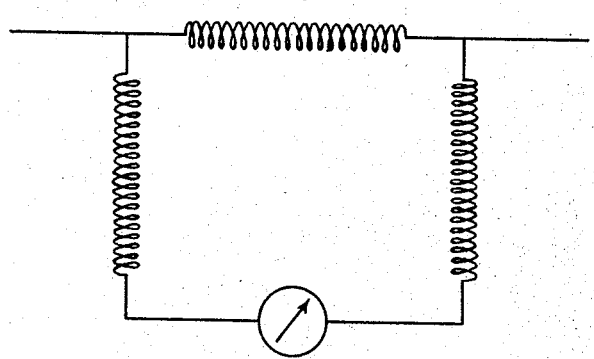
INVENTOR
C. W. HANSELL
BY
ATTORNEY Patented Aug. 30, 1932

1,874,977

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

HIGH FREQUENCY METER CONNECTION

Application filed May 2, 1927. Serial No. 188,156.

This invention relates to a method of connecting in circuit a high frequency meter, and more particularly of so connecting in circuit a meter which is necessarily located at an inaccessible point that open circuit need not result from burning out of the meter.

Often a high frequency meter must be connected directly to a line at some inaccessible point. One example of this is an antenna which is energized by means of a transmission line, in which case the reading of the current in the line is not a true indication of the radiation energy. In such cases I locate the ammeter in the antenna itself, and then read it with the aid of a telescope. This arrangement suffers from the disadvantage that in case the meter burns out the antenna circuit is opened, and it is difficult to make an immediate repair or replacement because of the inaccessible location of the meter. It is an object of my invention to so connect a meter to a conductor carrying high frequency energy that in case of meter burnout the circuit will not be opened.

This I do by dividing the conductor into branch circuits and inserting the meter in one of these circuits. The arrangement is analogous to that employed in an ordinary shunted direct current ammeter but differs in that the coupling is inductive rather than direct, and the relative current flow is dependent essentially on inductance values rather than resistance values. I have found that at the extremely high frequencies involved the inductance of even a short section of straight conductor offers sufficient reactance to be made use of both conveniently and advantageously.

The specification is accompanied by a drawing in which

Figure 1 is a perspective of the arrangement;

Figure 2 is a detail of the coupling employed; and

Figure 3 is a wiring diagram of the circuit.

Referring to Figure 1 the conductor 2 is a short wave antenna, exemplified in this case by a doublet or half-wave antenna, suspended between insulators 4 at an altitude which may be of the order of several hundred feet, and energized thru a transmission line 6 which is coupled to the antenna at the point 8. These preferably are so spaced, as disclosed more in detail in my copending application No. 161,769, filed January 18th, 1927, that the impedance therebetween, at the working frequency, is equal to the surge impedance of the transmission line. The antenna meter 10 may be inserted directly in series with the antenna about at the point shown. It should theoretically be located at the center of the antenna, but if so placed its reading has added to it the transmission line current flowing through the equivalent surge imperance. To avoid this the antenna meter is placed in the antenna outside of the points of transmission line coupling. This results in the meter registering somewhat lower than it should, but it may then be calibrated so as to give the desired correct reading.

As seen in Figure 1, according to my invention the antenna meter is connected in parallel with a portion of the antenna instead of being connected directly in series therewith. This coupling is shown more in detail in Figure 2, in which, as before, 2 is the antenna, 6 is one wire of the transmission line, 10 is the meter, $D_1$ is the portion of the antenna to which the meter is coupled, and the conductors 12 are the effective part of the meter circuit, which incidentally conveniently serve as supporting means for the meter.

The equivalent circuit of the arrangement shown in Figure 2 has been indicated in Figure 3. At the high frequencies involved the straight portions of conductor become essentially inductive reactances, and their resistances, as well as the reactance and resistance of the meter itself, become relatively negligible. For this reason the proportion in which the current will divide between the antenna and meter circuits may be approximately predicted from a measurement of the conductor lengths $D_1$ and $D_2$ indicated in Figure 2, and the proper range of meter required is easily selected. Of course, in actual practice the meter may be calibrated experimentally, and this will automatically compensate for the effect, if any, of the resistance of the branches and of the meter and also for the fact that the meter is located at a point away from the center of the antenna.

In one particular installation wherein $D_1$ was 1¼ inches and $D_2$ was 2½ inches the ratio between the current at the center of the antenna and the current flowing through the meter was 6⅔ to 1, and a three ampere meter was used to cover a 20 ampere range.

With a meter coupled as here disclosed, in case the antenna meter burns out the transmission circuit is not interrupted, and the antenna may be lowered and the defect repaired at any convenient time.

While the invention has been disclosed in connection with an elevated short-wave antenna the invention is not at all restricted thereto, but is equally applicable to the coupling of a meter to any high frequency circuit.

I claim:

1. The combination with an inaccessible linear portion of a conductor carrying high frequency energy of a meter supported upon and inductively coupled solely by means of short pieces of linear conductor in shunt with said linear conductor portion, the lengths of said short pieces of linear conductors having a definite relation to the length of said shunt portion of linear conductor for effecting calibration of said meter for total current, whereby burning out of the meter does not interrupt the flow of high frequency energy over the conductor.

2. The combination with an antenna fed by a transmission line of an antenna meter located just outside of the transmission line coupling on the antenna and coupled in shunt with a portion thereof by means of short pieces of linear conductors, the length of said short pieces of linear conductors having a definite relation to the length of the shunt portion of said antenna for effecting calibration of said meter for total current.

CLARENCE W. HANSELL.